UNITED STATES PATENT OFFICE.

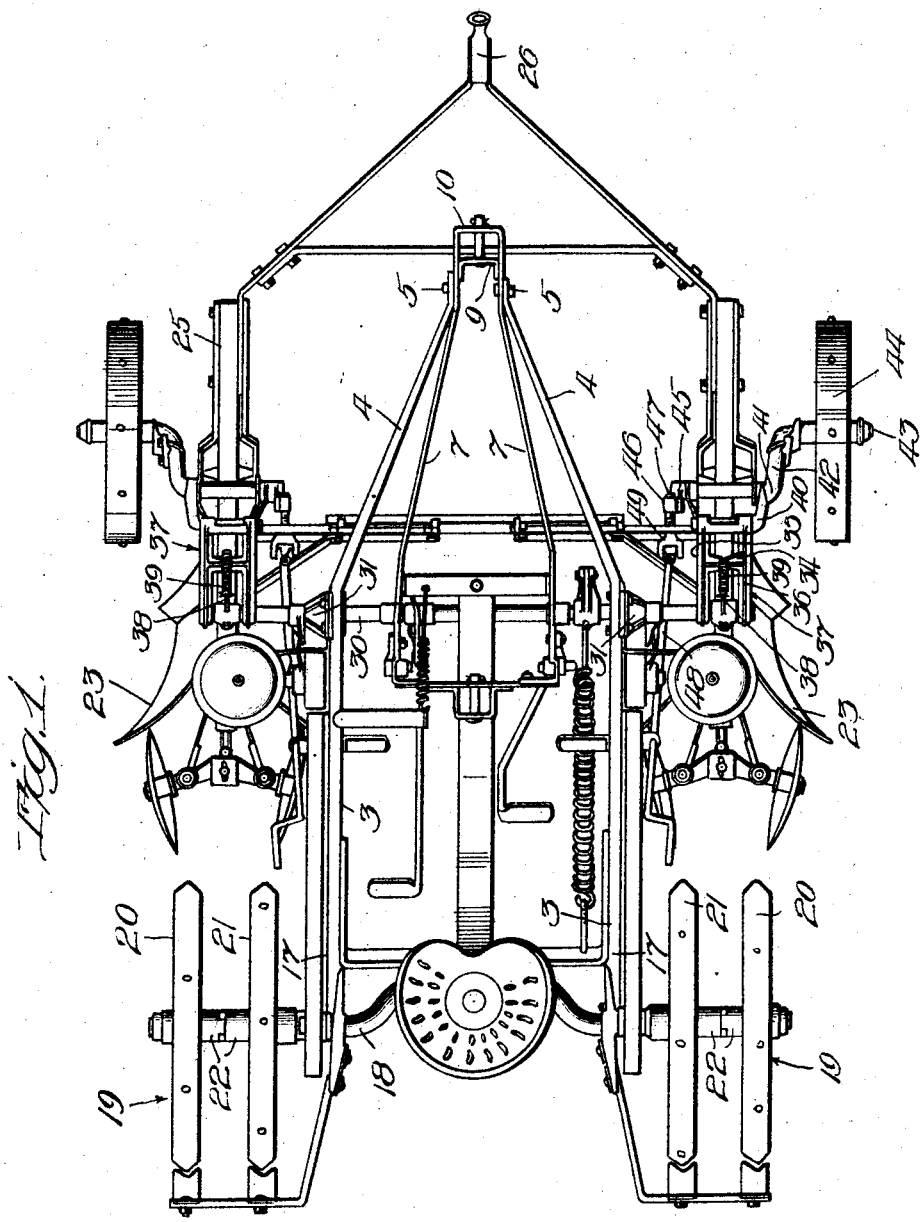

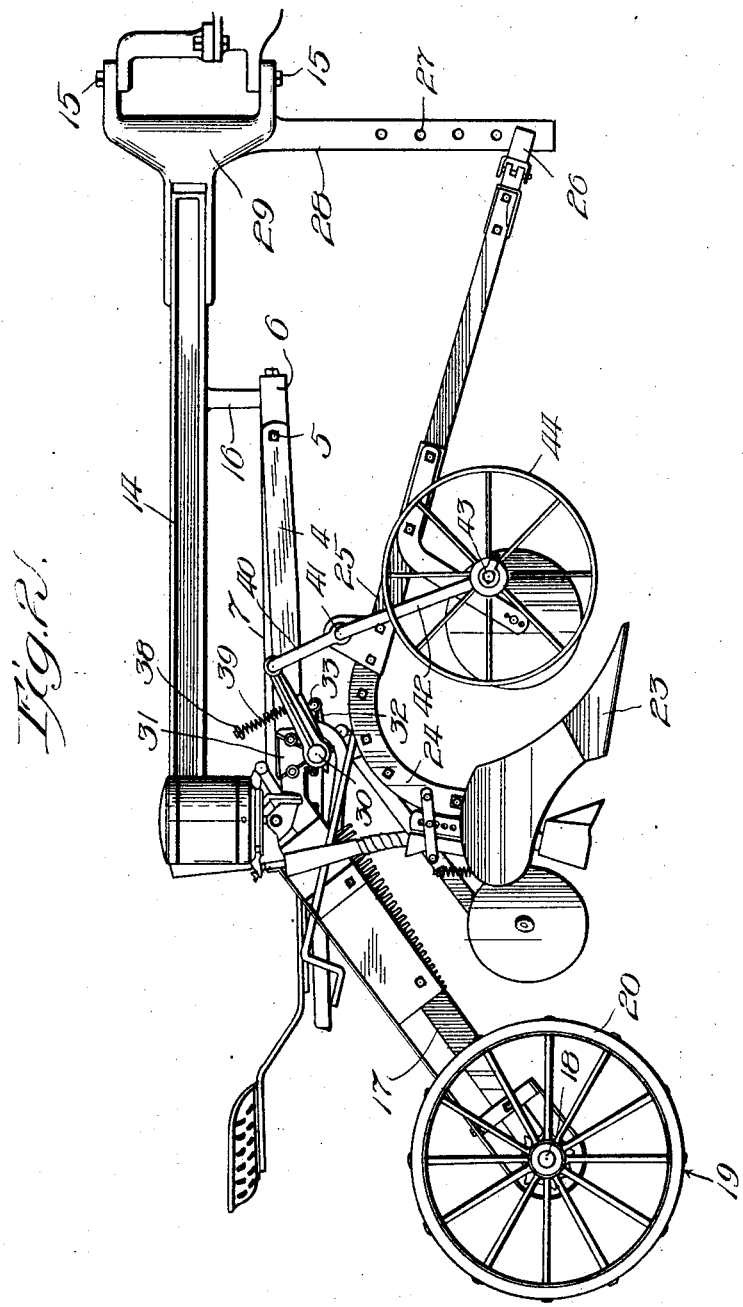

JOHN L. IRVING, OF MOLINE, ILLINOIS, ASSIGNOR TO MOLINE PLOW COMPANY, OF MOLINE, ILLINOIS, A CORPORATION OF ILLINOIS.

TILLAGE IMPLEMENT.

1,391,544.     Specification of Letters Patent.     Patented Sept. 20, 1921.

Application filed December 9, 1919. Serial No. 343,664.

*To all whom it may concern:*

Be it known that I, JOHN L. IRVING, a citizen of the United States, residing at Moline, in the county of Rock Island and State of Illinois, have invented certain new and useful Improvements in Tillage Implements, of which the following is a specification.

This invention relates to a tillage machine so designed as to permit the primary supporting wheels to follow in the furrows created by the tillage element or elements, thereby utilizing the supporting wheels for the purpose of pressing the soil toward the center of the furrows so as to cover the seed deposited therein. As shown, the invention is fitted to operate as a two-row lister, although the principle of the present invention is applicable to other forms of soil tilling and seeding implements.

By locating the wheels at the points immediately to the rear of the tillage implements, the machine will be positively maintained in a true line of advance, with the wheels at a uniform depth below the soil surface, and at the same time the carrying wheels, being located within the general plane of the machine, will not protrude laterally and come in contact with previously formed furrows or otherwise encounter marked inequalities in the ground surface. Other objects and features of the invention will appear from the specification.

In the drawings:

Figure 1 is a top or plan view of a two-row lister cultivator embodying the features of the present invention; and Fig. 2 is a side elevation of the same showing the tillage elements in raised position for purposes of transport.

The implement as a whole comprises a frame consisting of side rails 3 which converge toward their front ends 4, which front ends are secured at the points 5 to a center sub frame 6 comprising side rails 7 united at their rear ends by a cross bar 8. The sub frame is provided at its front end with a bridge plate 9 spaced rearwardly a short distance behind the front end bar 10 of the frame to afford a horizontal pivotal connection between the sub frame and a rearwardly extending beam 14 of a tractor, preferably of the unstable type, disclosed, for instance, in the Funk Patent No. 1,289,724, issued December 31, 1918. This type of tractor is provided with a rearwardly extending beam 14 which is connected with vertical pivots 15 at its forward end to the body of a two-wheel tractor. Connection between the beam 14 and the front and rear alined longitudinal pivots is afforded by means of front and rear hangers 16 depending from the beam and connecting with the respective pivot bolts so that the trailing implement will have a tilting connection with the beam, thereby permitting it to adapt itself more readily to inequalities in the ground surface.

The rear ends 17 of the side rails 3 composing the main frame are downwardly extended, as shown, and afford a mounting for the rear wheel shaft 18 upon which are journaled the primary supporting wheels 19, each of which is preferably of duplicate formation, comprising wheel sections 20 and 21 carried by hubs 22, each of which hubs projects in varying degree on opposite sides of the wheel section, so that the wheel sections can be mounted upon the shaft either with the long hub projections extending toward one another, as shown, in which case the wheel sections will be widely spaced, or with the short hub sections projecting toward one another, in which case the wheel sections will be held in much closer relations toward one another.

The wheels are located behind and in tracking relation with tillage elements 23, which in the form shown are lister bottoms, although other forms of tillage devices may be employed. The tillage devices are carried at the rear down curving ends 24 of beams 25, which beams at their forward ends are converged and vertically pivoted to a bracket 26, which in turn is horizontally pivoted within a selected hole 27 in a depending draft arm 28 downwardly extending from the yoke 29 which constitutes the front connecting portion of the tractor beam 14. This arrangement serves to impart the draft from the tractor directly to the tillage elements, the beam being relied upon to provide vertical stability to the tractor without serving as a draft element in any substantial degree.

Each of the tillage beams 25 is fitted for vertical adjustment to vary the depth of the tillage elements, which adjustment is effected in the following manner: A cross shaft 30, is journaled within hangers 31 carried by the side rails 4 of the main frame and adapted to be rocked by a suitable adjusting means which in the specific form shown, constitutes no portion of the present invention and need not be here described, and the shaft near each end is provided with a forwardly extending rigidly secured arm 32, each of which arms at its outer end has pivoted thereto an upstanding draw rod 33 which is entered through a bridge plate 34, which at a medial point connects the inner and outer bars 35 and 36 respectively of a pressure link 37, the rear ends of which bars are loosely pivoted upon the rock shaft 30 in position to straddle the intermediate arm 32. The upper end of the draw rod 33 carries a nut and washer 38 which contacts a spring 39 encircling the draw rod 33, the lower end of the spring bearing against the bridge plate 34, so that as the arm 32 is rocked downwardly it will exert a pull on the draw rod which extends freely through the bridge plate, which latter will receive the pressure at the lower end of the spring, thereby forcing down the forward free ends of the inner and outer arms 35 and 36 of the pressure link 37. The forward ends of the bars 35 and 36 are pivoted to the cross rod of a yoke 40, the lower ends of which are pivoted to an inward extension 41 of a depending axle 42 outturned at its lower end 43 to afford a journal mounting for a gage wheel 44.

In order to maintain the gage wheels in proper vertical relation to the tillage elements, an arm 45 is rigidly secured to the inner end of the axle extension 41, which arm carries a screw collar 46 which rides on the threaded end 47 connected to a hand adjusting rod 48 by means of a universal connection 49, the arrangement being such that as the adjusting rod is rotated the collar 46 will ride back and forth, thereby serving to adjust the gage wheels to the proper elevation. The above construction is duplicated on each side of the machine.

The specific details of the mechanism for imparting pressure to the beam 25 and the specific means for mounting and adjusting the gage wheels form no part of the present invention and serve merely for the purpose of illustrating a suitable and convenient mechanism for imparting the necessary vertical adjustments to these portions of the implement.

In operation, in association with an unstable two-wheel tractor, the rear end of the tractor will be supported, through the medium of the tractor beam, upon the inner or sub frame, which in turn is supported by the main frame which mounts the primary supporting wheels. This arrangement affords a connection for the rear end of the tractor, which is resistant against vertical thrust and at the same time affords the necessary freedom of movement in a lateral direction to accommodate the irregularities in the ground. The draft, however, is mainly imparted through the beams which carry the tillage elements, which, of course, encounter the major portion of the ground resistance so that the high connections between the tractor and the trailing implement are relieved from draft strains in a large measure and serve mainly, if not entirely, to resist the vertical strains due to the torque of the tractor and afford a rigid structure which projects over the space occupied by the tillage elements and the adjusting mechanisms therefor.

By mounting the main supporting wheels at the rear end of the main frame and in tracking relation with the tillage elements, the wheels serve not only to press down the soil but stand well in toward the longitudinal center of the machine and in position to best support the vertical thrust imposed upon them. At the same time the wheels, by tracking directly in the furrows formed by the tillage elements, are enabled to ride over comparatively even ground and to relieve the implement from racking strains which would be imposed upon it if the wheels occupied positions outside of the furrows. The arrangement is one which is well designed to facilitate the guiding and turning of the tractor in the field and to afford a structure which is strong, rigid and well designed to meet the strains imposed upon it.

I claim:

1. In an implement of the class described, the combination of a main frame adapted for connection with an elevated portion of a tractor, tillage elements located beneath the main frame and adjustable with respect thereto, a tillage beam adapted for connection with a lowdown portion of the tractor, and main supporting wheels carried by the main frame to the rear of the tillage elements and in tracking relation therewith, substantially as described.

2. In an implement of the class described, the combination of a main frame consisting of spaced side rails downwardly extending at their rear ends, main supporting wheels journaled at the rear ends of the main frame, the forward end of the main frame being adapted for connection with an elevated portion of a tractor, tillage elements located below the main frame and in front of the main supporting wheels and in alined relation therewith, and a tillage beam adapted for connection at its forward end with a lowdown portion of the tractor, substantially as described.

3. In an implement of the class described, the combination of a main frame consisting of spaced side rails downwardly extending at their rear ends, main supporting wheels journaled at the rear ends of the main frame, the forward end of the main frame being adapted for connection with an elevated portion of a tractor, tillage elements located below the main frame and in front of the main supporting wheels and in alined relation therewith, means for varying the vertical elevation of the tillage elements, and a tillage beam adapted for connection at its forward end with a lowdown portion of the tractor, substantially as described.

4. In an implement of the class described, the combination of a main frame adapted for connection with an elevated portion of a tractor, tillage elements located beneath the main frame and adjustable with respect thereto, a tillage beam adapted for connection with a lowdown portion of the tractor, and main supporting wheels carried by the main frame to the rear of the tillage elements and in tracking relation therewith, the main supporting wheels each being composed of companion sections in spaced relation and having treads designed to press the soil toward the center, substantially as described.

5. In an implement of the class described, the combination of a main frame consisting of spaced side rails downwardly extending at their rear ends, main supporting wheels journaled at the rear ends of the main frame, the forward end of the main frame being adapted for connection with an elevated portion of a tractor, tillage elements located below the main frame and in front of the main supporting wheels and in alined relation therewith, and a tillage beam adapted for connection at its forward end with a lowdown portion of the tractor, the main supporting wheels each being composed of companion sections in spaced relation and having treads designed to press the soil toward the center, substantially as described.

6. In an implement of the class described, the combination of a main frame consisting of spaced side rails downwardly extending at their rear ends, main supporting wheels journaled at the rear ends of the main frame, the forward end of the main frame being adapted for connection with an elevated portion of a tractor, tillage elements located below the main frame and in front of the main supporting wheels and in alined relation therewith, means for varying the vertical elevation of the tillage elements, and a tillage beam adapted for connection at its forward end with a lowdown portion of the tractor, the main supporting wheels each being composed of companion sections in spaced relation and having treads designed to press the soil toward the center, substantially as described.

7. In an implement of the class described, the combination of a main frame, tillage elements located below and supported from the main frame, and carrying wheels journaled to the main frame behind and in tracking relation with the tillage elements, substantially as described.

8. In an implement of the class described, the combination of a main frame, tillage elements located below and supported from the main frame, and carrying wheels journaled to the main frame behind and in tracking relation with the tillage elements, each of the carrying wheels being composed of two spaced sections having a rim formation adapted to press the earth toward the space between the sections, substantially as described.

9. In an implement of the class described, the combination of a main frame, tillage elements located below and supported from the main frame, and carrying wheels journaled to the main frame behind and in tracking relation with the tillage elements, each of the carrying wheels being composed of two spaced sections having a rim formation adapted to press the earth toward the space between the sections, and each section mounted on a hub projecting unequally on opposite sides of the wheel section and adapting the wheel sections to be reversed with respect to one another to vary the distance between the sections, substantially as described.

10. The combination with a two wheel tractor of the unstable type, of a lister planter having a frame, tillage elements located beneath the frame and adjustable relative thereto, a tillage beam adapted to be connected with a lowdown portion of the tractor, and main supporting wheels carried by the lister frame to the rear of the tillage elements and in tracking relation therewith, so that the lister combines with the tractor into a stabilized unit with the supporting wheels serving to absorb the reaction of the tractor as well as to support the lister and act as covering wheels.

JOHN L. IRVING.